US009003621B2

(12) United States Patent
Ko

(10) Patent No.: US 9,003,621 B2
(45) Date of Patent: Apr. 14, 2015

(54) HAND-HELD RIVET NUT (RIVET BOLT) TOOL WITH QUICK-CHANGE MANDREL

(71) Applicant: Karat Industrial Corporation, New Taipei (TW)

(72) Inventor: Philey Ko, New Taipei (TW)

(73) Assignee: Karat Industrial Corporation, New Taipei (TW)

(*) Notice: Subject to any disclaimer, the term of this patent is extended or adjusted under 35 U.S.C. 154(b) by 262 days.

(21) Appl. No.: 13/674,428

(22) Filed: Nov. 12, 2012

(65) Prior Publication Data

US 2014/0033492 A1 Feb. 6, 2014

(30) Foreign Application Priority Data

Aug. 3, 2012 (TW) ............................ 101127964 A

(51) Int. Cl.

| | |
|---|---|
| ***B23P 11/00*** | (2006.01) |
| ***B21D 31/00*** | (2006.01) |
| ***B21D 9/05*** | (2006.01) |
| ***B21J 15/38*** | (2006.01) |
| ***B25B 27/00*** | (2006.01) |

(52) U.S. Cl.

CPC ........... *B21J 15/386* (2013.01); *B25B 27/0007* (2013.01)

(58) Field of Classification Search

USPC ......... 29/243.53, 243.528, 243.521, 243.527; 72/391.8

See application file for complete search history.

(56) References Cited

U.S. PATENT DOCUMENTS

| | | | | |
|---|---|---|---|---|
| 4,653,308 | A * | 3/1987 | Gregory | 29/243.527 |
| 5,079,818 | A * | 1/1992 | Schwab | 29/243.527 |
| 5,323,521 | A * | 6/1994 | Freund et al. | 29/243.527 |
| 5,359,762 | A * | 11/1994 | Liu | 29/243.527 |
| 5,367,757 | A * | 11/1994 | Liu | 29/243.527 |
| 5,729,880 | A | 3/1998 | Ko | |
| 5,771,738 | A * | 6/1998 | Ko | 72/391.8 |
| 6,912,763 | B2 * | 7/2005 | Kovar | 29/243.527 |
| 7,051,411 | B2 * | 5/2006 | Liu | 29/243.527 |
| 8,485,011 | B2 * | 7/2013 | Hastings et al. | 29/243.526 |

FOREIGN PATENT DOCUMENTS

DE 9001315.8 U1 5/1990

OTHER PUBLICATIONS

European Patent Office, Extended European Search Report for corresponding EP Patent Application No. 12193423.6 dated Aug. 5, 2014, 4 pages.

* cited by examiner

*Primary Examiner* — Lee D Wilson
*Assistant Examiner* — Seahee Yoon
(74) *Attorney, Agent, or Firm* — C. G. Mersereau; Nikolai & Mersereau, P.A.

(57) ABSTRACT

A hand-held rivet nut (rivet bolt) tool has a body, a sleeve, a positioning ring and a mandrel. The body includes a base and a pair of handles. The handles are respectively pivotally connected to two sides of the base. The sleeve is axially movably mounted through the base and includes an annular mounting groove. The positioning ring is seated in the annular mounting groove of the sleeve and includes an inner portion. The mandrel is rotatably mounted through the sleeve and includes an annular positioning groove allowing the inner portion of the positioning ring to engage therewith. The manufacturing process of the holding structure between the mandrel and sleeve is simplified because it only has steps of forming the annular mounting groove and then seating the positioning ring in the annular mounting groove, which increases production efficiency and reduces manufacturing time and costs.

18 Claims, 9 Drawing Sheets

A–A

HAND-HELD RIVET NUT (RIVET BOLT) TOOL WITH QUICK-CHANGE MANDREL

BACKGROUND OF THE INVENTION

1. Field of the Invention

The present invention relates to a hand-held rivet nut (rivet bolt) tool, and more particularly to a hand-held rivet nut (rivet bolt) tool having a quick-change mandrel that reduces manufacturing time and costs, also offering a solution to solve the headache problem of rivet nut (rivet bolt) jammed with the mandrel.

2. Description of the Related Art

A hand-held rivet nut (rivet bolt) tool is adapted to set rivet nuts (rivet bolts) in a work piece. With reference to FIGS. 8 and 9, a conventional hand-held rivet nut tool disclosed in U.S. Pat. No. 5,729,880 comprises a body 60, an operating handle 61, a sleeve 70 and a mandrel 80. The operating handle 61 is pivotally connected to the body 60. The sleeve 70 is movably mounted through the body 60, is actuated by the operating handle 61 and has a threaded hole 71 extending radially therethrough for receiving a ball 72, a spring 73 and a bolt 74. The spring 73 urges the ball 72 so that the ball 72 partially protrudes from an inner surface of the sleeve 70. The mandrel 80 is rotatably mounted through the sleeve 70 and includes an outer surface, a front threaded portion 81 and an annular groove 82. The front threaded portion 81 is provided with an external thread. The annular groove 82 is fonned in the outer surface of the mandrel 80 and corresponds to the ball 72. The spring 73 forces the ball 72 into engagement with the annular groove 82 to hold the mandrel 80 in position in the sleeve 70. In operation, a rivet nut 90 is screwed onto the front threaded portion 81 of the mandrel 80 and is then inserted into a predrilled hole in a work piece. Afterward the operating handle 61 is pushed to move the sleeve 70 and mandrel 80 rearward. The moving mandrel 80 pulls the rivet nut 90 so that the rivet nut 90 is then defonned and is set in a work piece. After the rivet nut 90 is set, the mandrel 80 is rotated to screw out of the rivet nut 90.

The holding structure between the mandrel 80 and sleeve 70 as described above is a quick-change structure. Therefore, mandrels 80 of different thread sizes can be quickly interchanged to conform to rivet nuts 90 of different thread sizes. However, the manufacturing process of such holding structure is complicated because it comprises steps of drilling and tapping the threaded hole 71, putting the ball 72 and spring 73 into the threaded hole 71 and then screwing the bolt 74 into the threaded hole 71, which decreases production efficiency and increases manufacturing time and costs. Moreover, the ball 72 engages the annular groove 82 only at a point. The area of engagement between the ball 72 and annular groove 82 is too small so that the mandrel 80 may become accidentally disengaged. Furthermore, when the rivet nut 90 is jammed on the mandrel 80, the work piece or rivet nut tool must be destroyed in order to take out the jammed rivet nut 90, thus causing huge inconvenience.

To overcome the shortcomings, the present invention provides a hand-held rivet nut (rivet bolt) tool with quick-change mandrel to mitigate or obviate the aforementioned problems.

SUMMARY OF THE INVENTION

The main objects of the present invention are to provide a hand-held rivet nut (rivet bolt) tool having a quick-change mandrel that reduces manufacturing time and costs, and offering a solution to solve the headache problem of rivet nut (rivet bolt) jammed with the mandrel.

To achieve the foregoing objectives, the hand-held rivet nut (rivet bolt) tool in accordance with the present invention comprises a body, a sleeve, a positioning ring and a mandrel. The body includes a base, a pair of handles and a driven member. The base has a bottom surface, two sides and a bore therethrough. The handles are respectively pivotally connected to the two sides of the base. The driven member is disposed between the handles and has two sides respectively pivotally connected to the handles by links. The sleeve is axially movably mounted through the bore of the base and includes a bottom portion, a central line, a hole and an annular mounting groove. The bottom portion of the sleeve extends from the bottom surface of the base and is connected to the driven member. The hole is formed in the central line of the sleeve and has an inner surface. The annular mounting groove is formed in the inner surface of the hole of the sleeve. The positioning ring includes an inner portion extending from the inner surface of the hole of the sleeve and is seated in the annular mounting groove of the sleeve. The mandrel is rotatably mounted through the hole of the sleeve and includes a shaft having an outer surface, an annular positioning groove and a threaded portion. The annular positioning groove is formed in the outer surface of the shaft and allows the inner portion of the positioning ring to engage therewith to hold the mandrel in position in the sleeve. Since the area of engagement between the inner portion of the positioning ring and annular positioning groove is large, the mandrel can be securely held and does not happen accidentally disengaged. The manufacturing process of the holding structure between the mandrel and sleeve is simplified because it only comprises steps of forming the annular mounting groove and then seating the positioning ring in the annular mounting groove, which increases production efficiency and reduces manufacturing time and costs.

The mandrel further includes a head having a non-circular annular flange. The hand-held rivet nut (rivet bolt) tool further comprises a limit piece and a limit piece retainer. The limit piece is mounted around the annular flange of the head of the mandrel and has a center, two sides, two edges, a locking aperture and two notches. The locking aperture is formed through the center of the limit piece for receiving the annular flange of the head of the mandrel. The shape of the locking aperture corresponds to the non-circular shape of the annular flange of the head of the mandrel to prevent the mandrel from rotating relative to the limit piece. The two notches are respectively formed in the two sides of the limit piece. The two handles are received in the two notches or abut the two edges of the limit piece, thus preventing the mandrel from rotating relative to the sleeve. The limit piece retainer is put onto the head of the mandrel to avoid the limit piece dropping from the annular flange of the head of the mandrel during operation. When a rivet nut or rivet bolt is jammed with the mandrel, the limit piece can be mounted around the annular flange of the head of the mandrel to fix the mandrel relative to the sleeve, and the limit piece retainer can be put onto the head of the mandrel to avoid the limit piece dropping from the annular flange of the head of the mandrel during operation. Then an operator can easily rotate the entire rivet nut (rivet bolt) tool to disengage the mandrel from the jammed rivet nut or rivet bolt. The rivet nut (rivet bolt) tool having the limit piece enables the operator to easily disengage the mandrel from the jammed rivet nut or rivet bolt without destroying the work piece or rivet nut (rivet bolt) tool.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
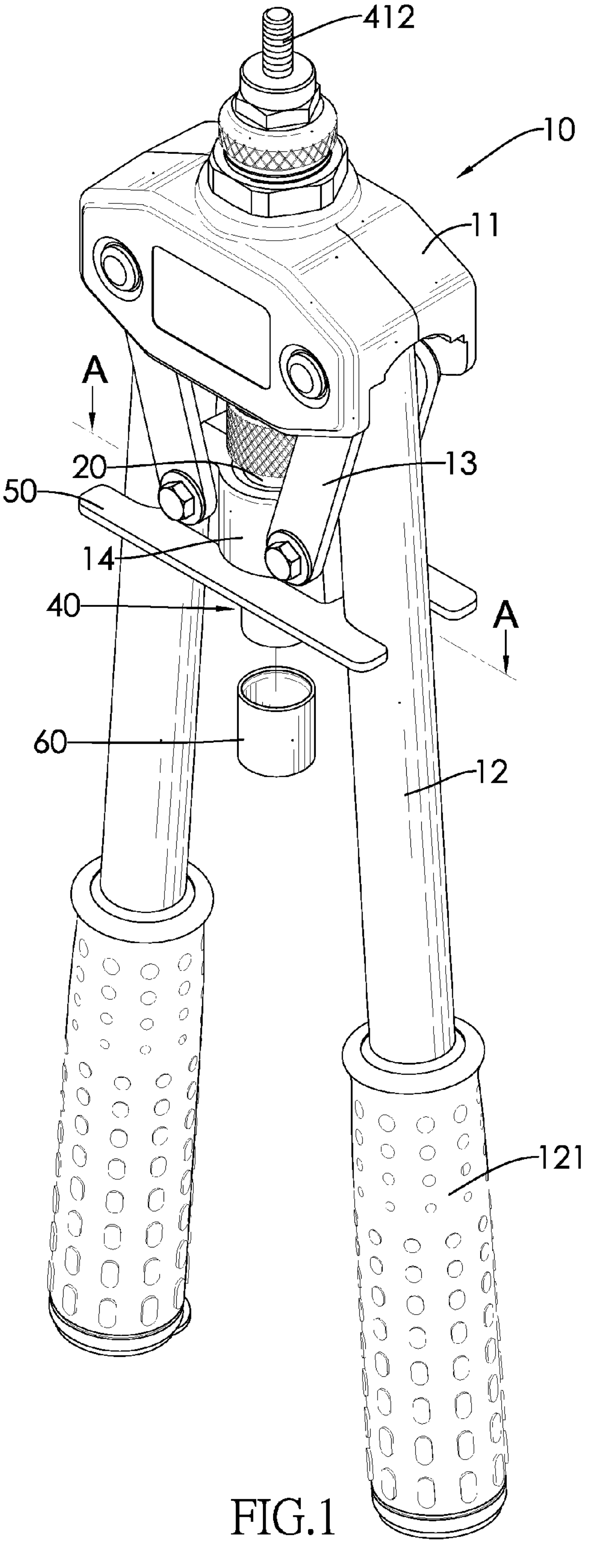
FIG. 1 is a perspective view of a hand-held rivet nut tool with a rivet nut mandrel in accordance with the present invention.

With reference to FIGS. 1, 2 and FIGS. 5, 6, a hand-held rivet nut (rivet bolt) tool in accordance with the present invention comprises a body 10, a sleeve 20, a positioning ring 30, a mandrel 40, 40A and a limit piece 50.

The body 10 includes a base 11, a pair of handles 12, a pair of links 13 and a driven member 14. The base 11 has a bottom surface, a center, two sides and a bore 111. The bore 111 extends through the center of the base 11. The handles 12 are respectively pivotally connected to the two sides of the base 11. Each handle 12 has a grip 121 at a lower portion thereof. The driven member 14 is disposed below the base 11 between the handles 12 and has a bottom surface, a center, two sides and a threaded hole 141. The two sides of the driven member 14 are respectively pivotally connected to the handles 12 by the links 13. The threaded hole 141 extends through the center of the driven member 14 and aligns with the bore 111 of the base 11.

Figure 3:
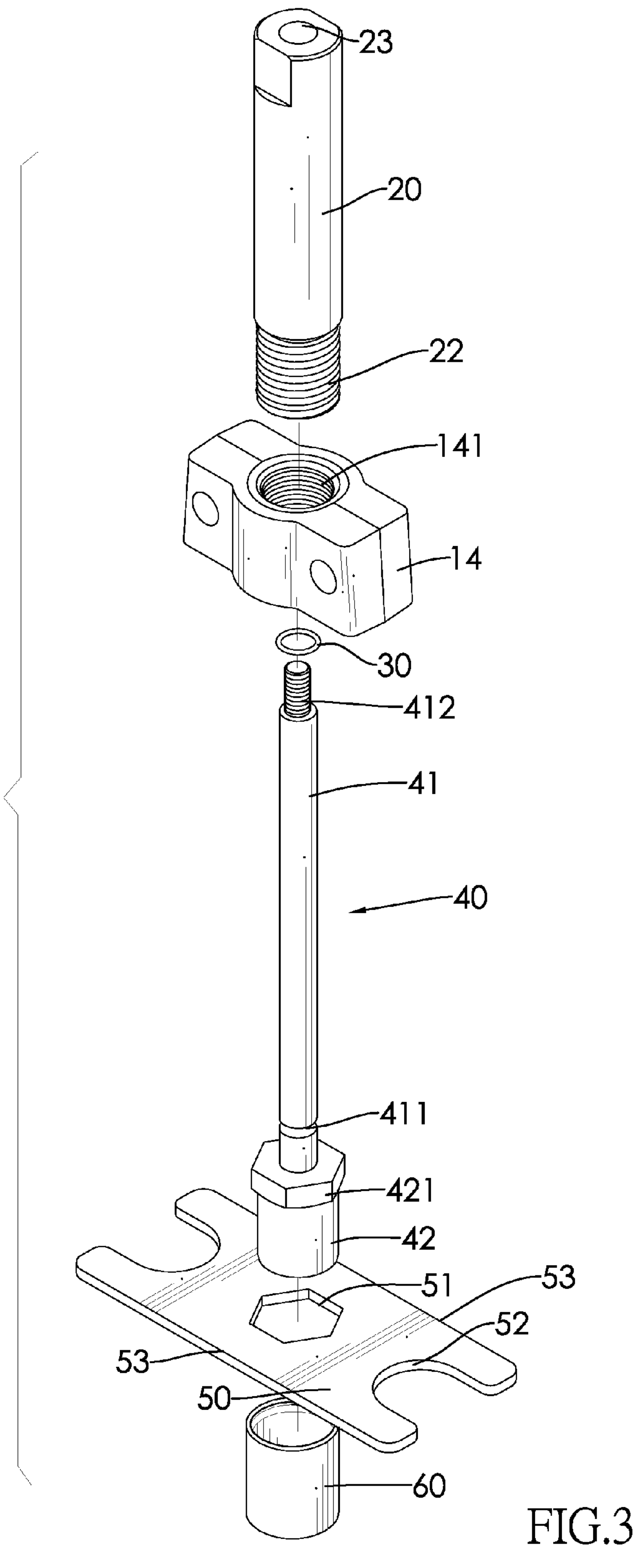
FIG. 3 is partially exploded perspective view of the hand-held rivet nut tool in FIG. 1.
Figure 7:
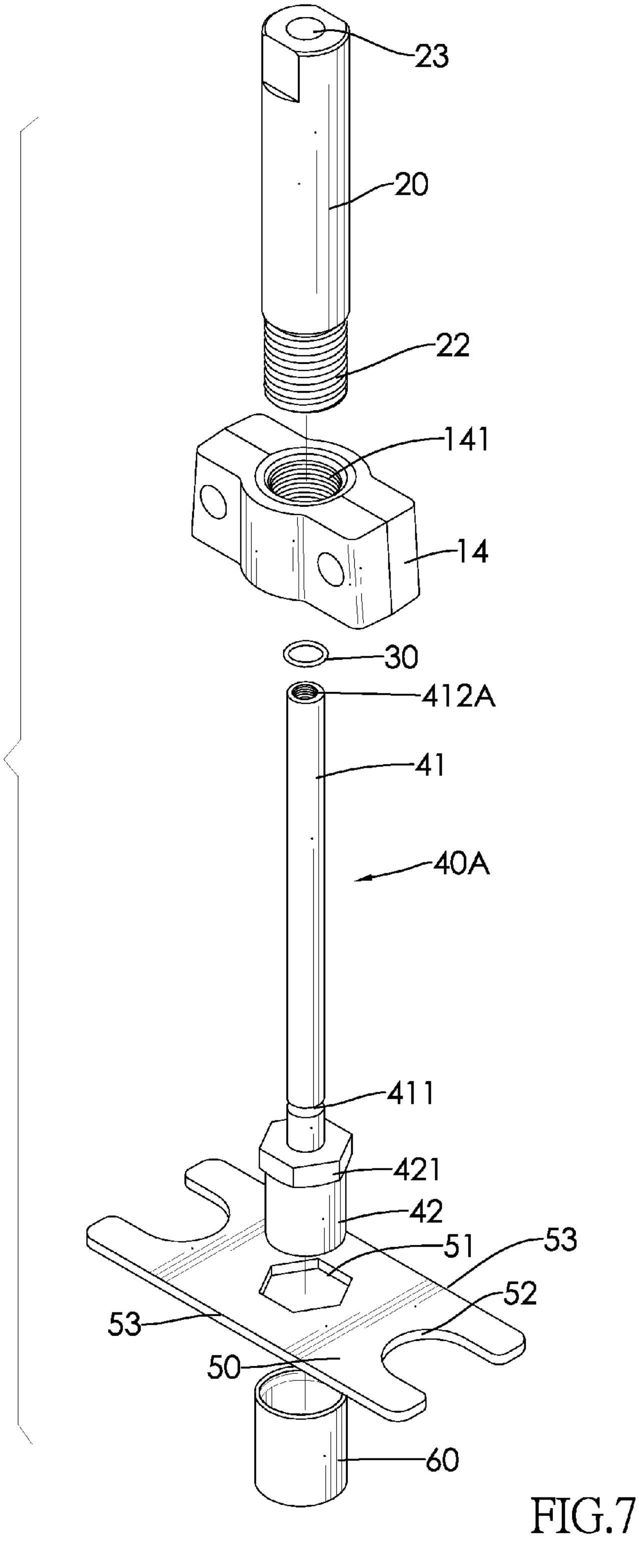
FIG. 7 is a partially exploded perspective view of the hand-held rivet bolt tool in FIG. 5.
Figure 8:
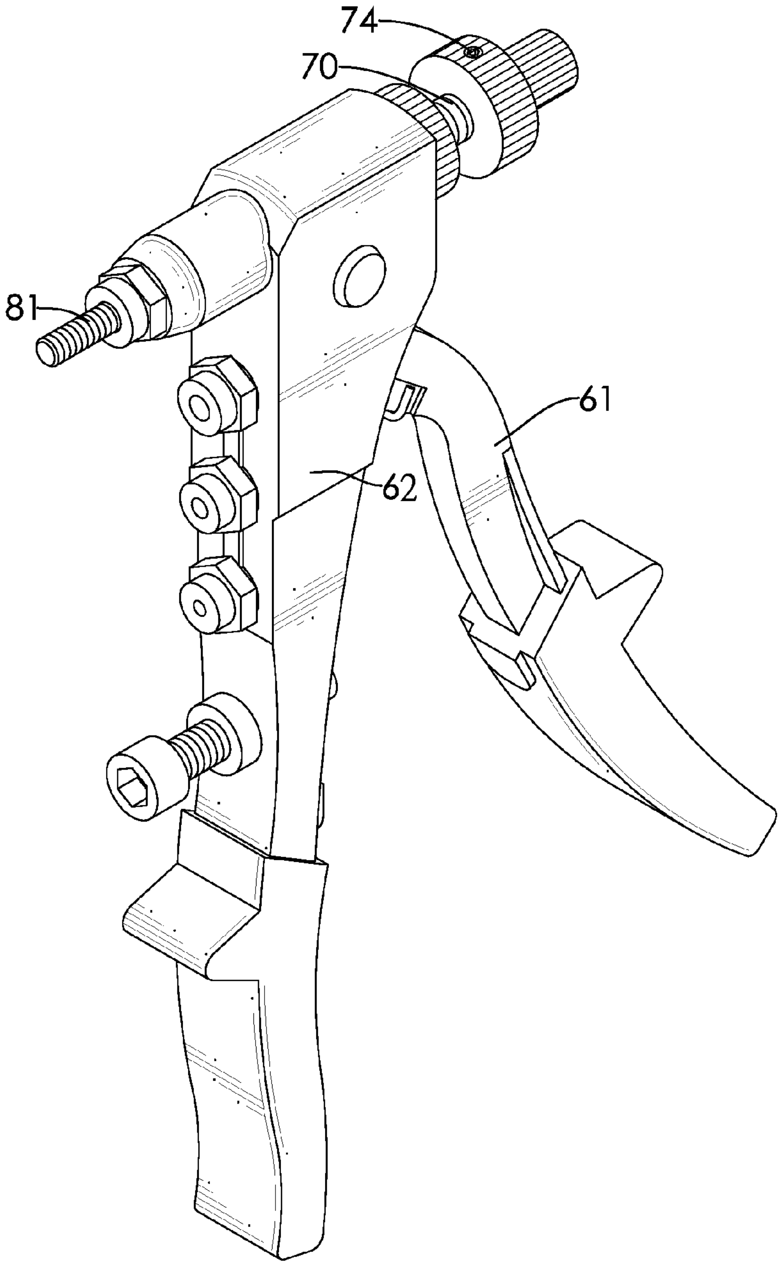
FIG.8 PRIOR ART
FIG. 8 is a perspective view of a conventional hand-held rivet nut tool in accordance with the prior art.
Figure 9:
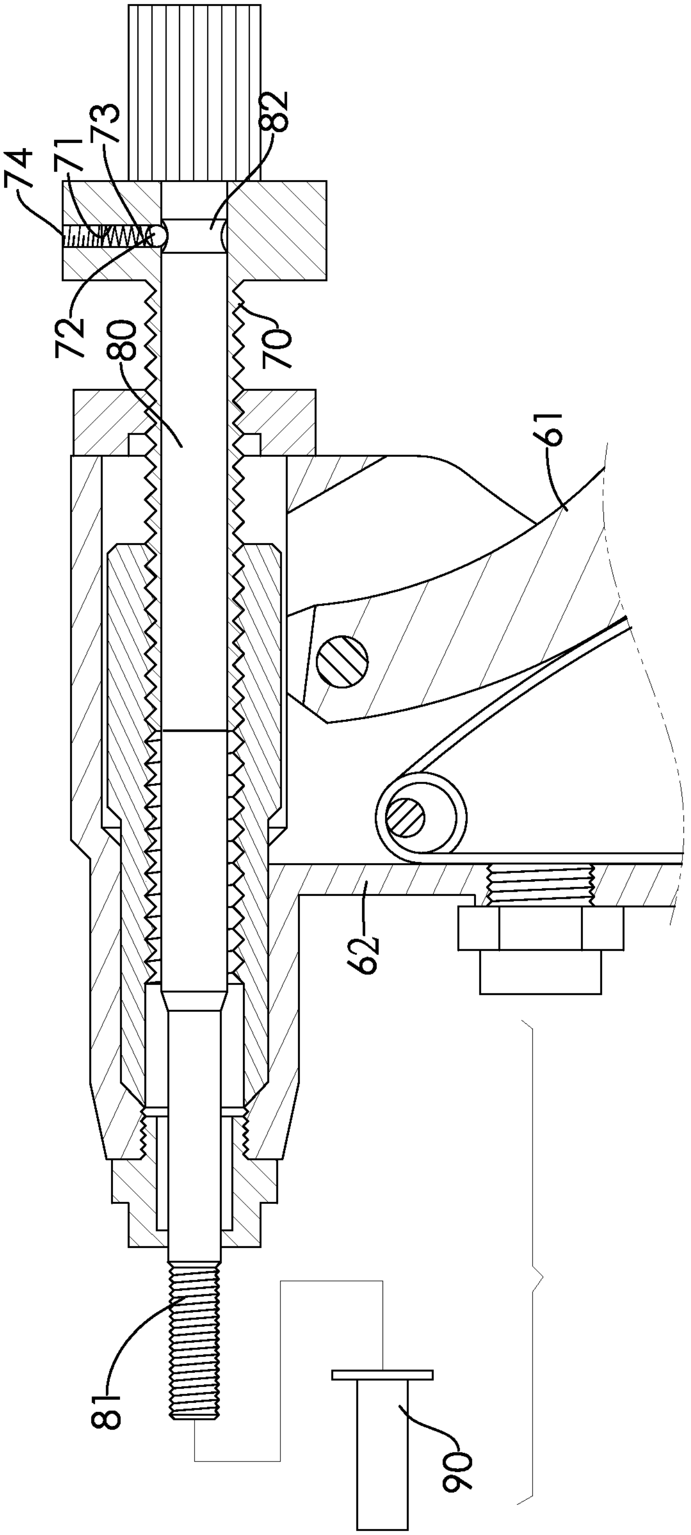
FIG.9 PRIOR ART
FIG. 9 is an enlarged side view in partial section of the conventional hand-held rivet nut tool in FIG. 8.

The sleeve 20 is axially movably mounted through the bore 111 of the base 11 and includes a top end, a bottom portion, a central line, a hole 23 and an annular mounting groove 21. With further reference to FIGS. 3 and 7, the bottom portion of the sleeve 20 extends from the bottom surface of the base 11 and is connected to the driven member 14. Preferably, the bottom portion of the sleeve 20 has an external thread 22 screwed with the driven member 14 via the threaded hole 141. The hole 23 is formed in the central line of the sleeve 20 and has an inner surface and an inner diameter. The annular mounting groove 21 is formed in the inner surface of the hole 23 of the sleeve 20.

The positioning ring 30 is resilient, may be made of rubber, plastic, metal or the like. The positioning ring 30 includes an inner portion extending from the inner surface of the hole 23 of the sleeve 20 and is seated in the annular mounting groove 21 of the sleeve 20.

Figure 2:
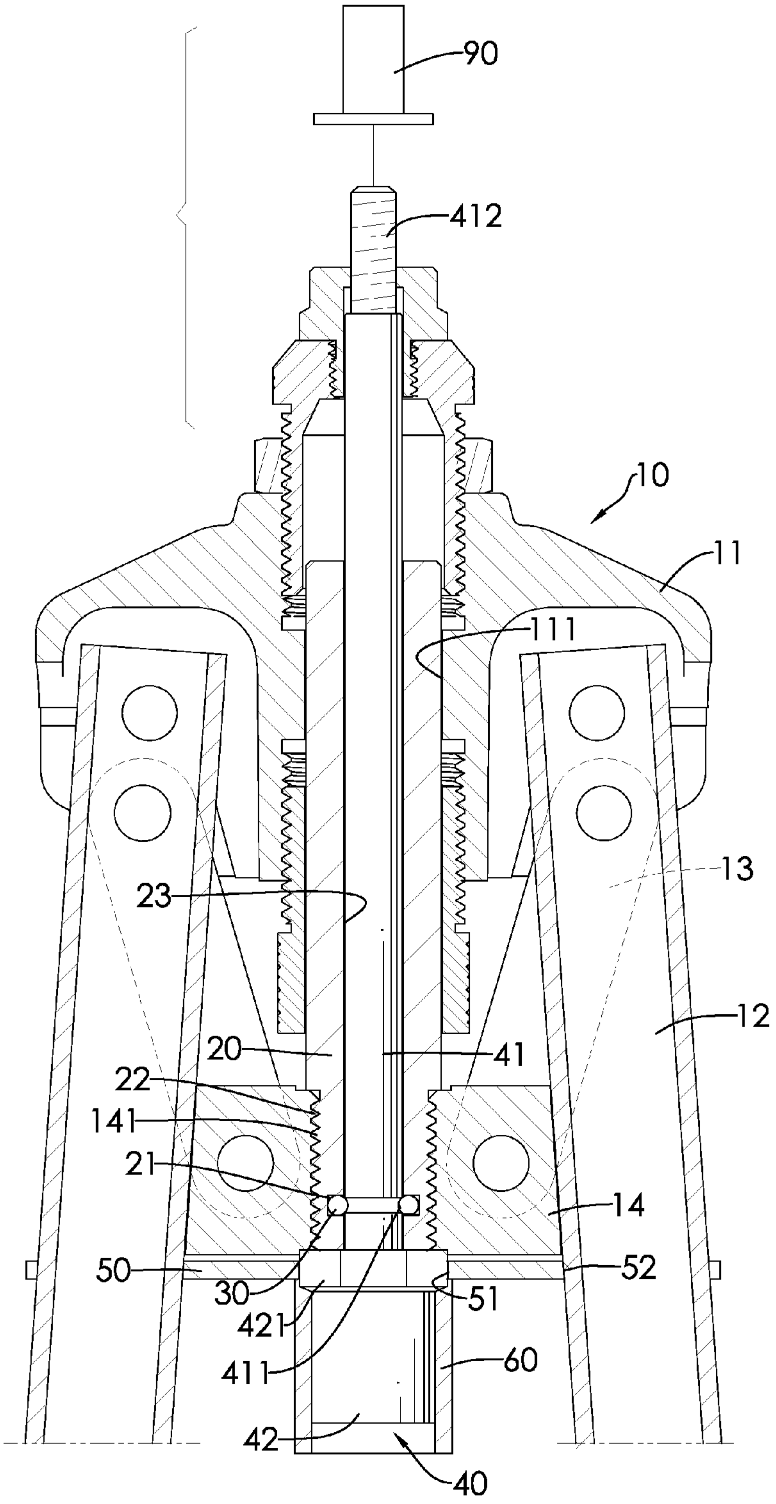
FIG. 2 is an enlarged side view in partial section of the hand-held rivet nut tool in FIG. 1.
Figure 5:
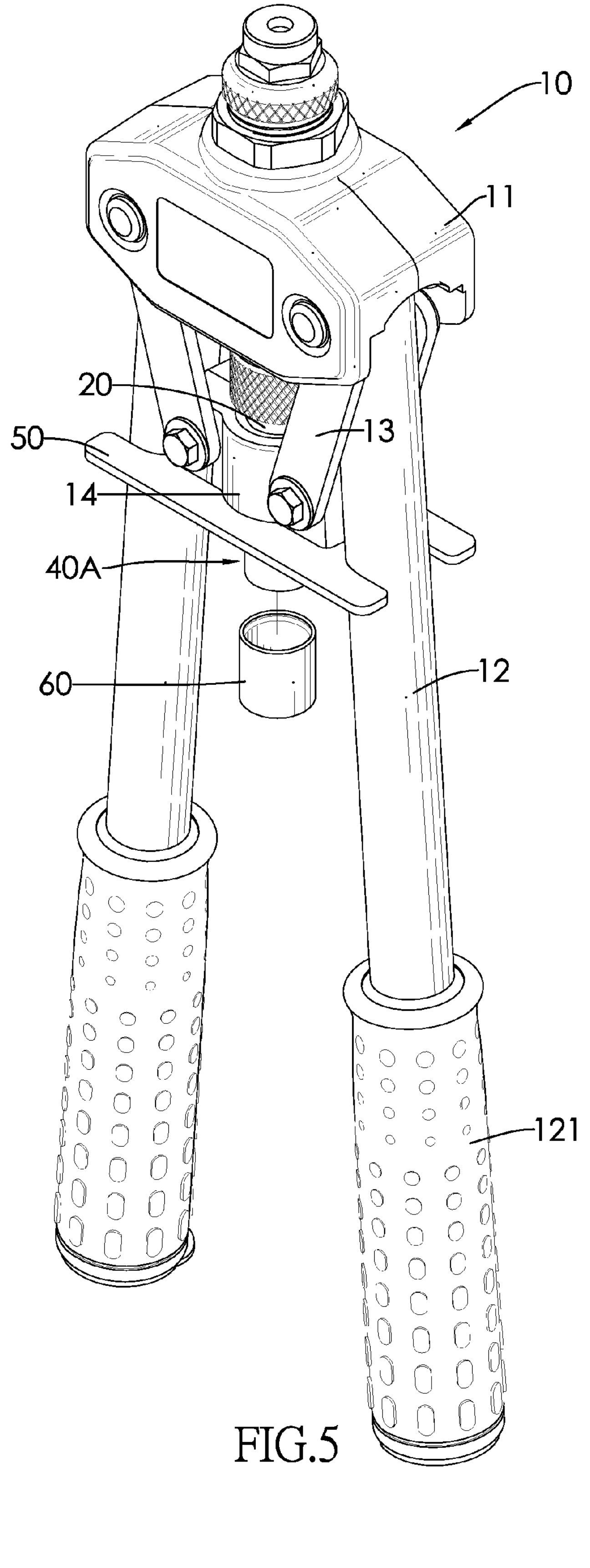
FIG. 5 is a perspective view of another embodiment of a hand-held rivet bolt tool with a rivet bolt mandrel in accordance with the present invention.
Figure 6:
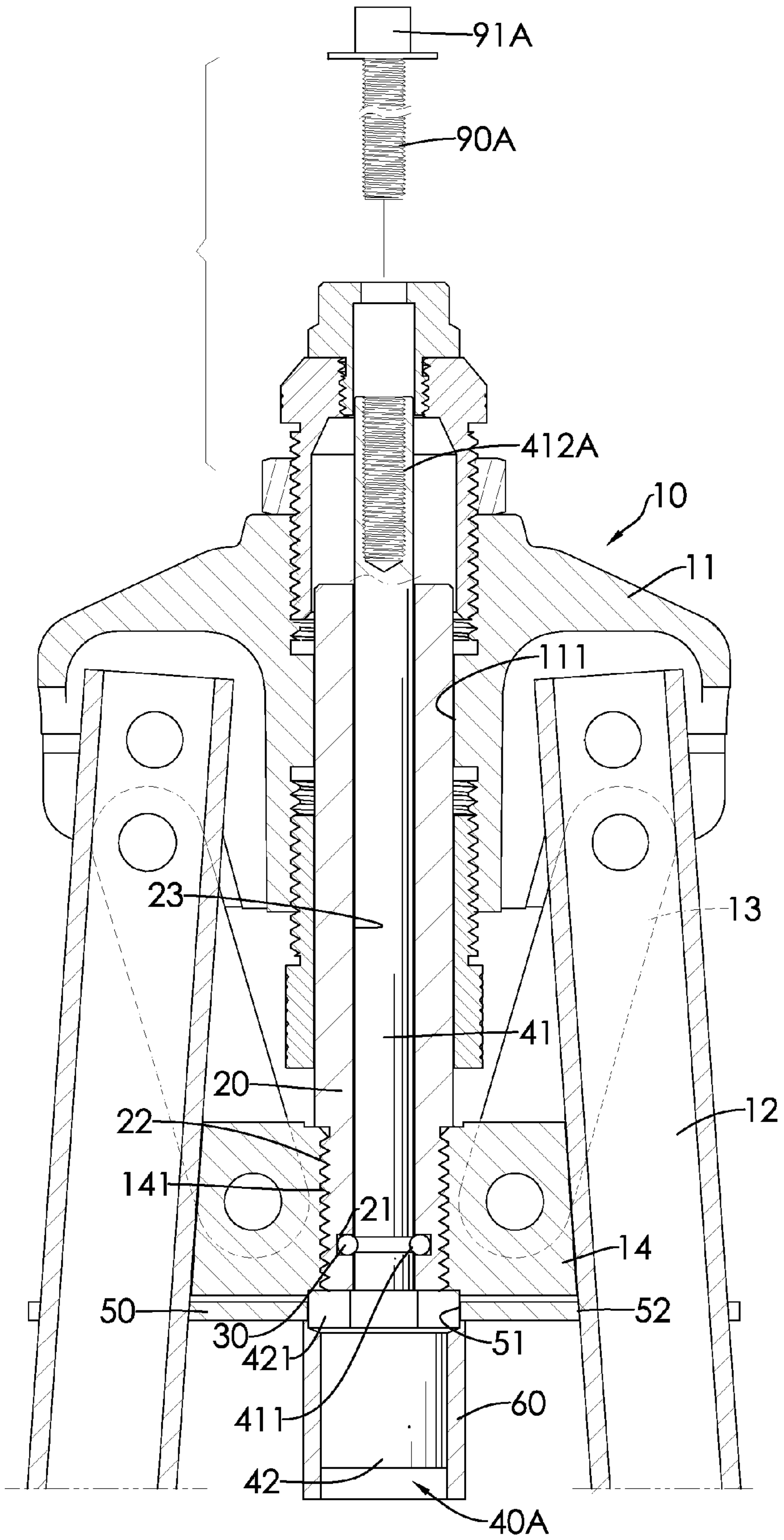
FIG. 6 is an enlarged side view in partial section of the hand-held rivet bolt tool in FIG. 5.

The mandrel 40, 40A is rotatably mounted through the hole 23 of the sleeve 20 and includes a shaft 41 and a head 42. The shaft 41 has an outer diameter, an outer surface, a bottom end, a top portion, an annular positioning groove 411 and a threaded portion 412, 412A. The inner diameter of the hole 23 is a little larger than the outer diameter of the shaft 41 to allow the shaft 41 to mount through the hole 23. The annular positioning groove 411 is formed in the outer surface of the shaft 41 and allows the inner portion of the positioning ring 30 to resiliently engage therewith. Thus, the mandrel 40, 40A is held in position in the sleeve 20 and cannot move axially but can rotate freely. Since the area of engagement between the inner portion of the positioning ring 30 and annular positioning groove 411 is large, the mandrel 40, 40A can be securely held and does not happen accidentally disengaged. The threaded portion 412, 412A is formed on the top portion of the shaft 41 and extends from the top end of the sleeve 20. With reference to FIGS. 1 to 3, in a preferred embodiment, the mandrel 40 is a rivet nut mandrel and the threaded portion 412 of the rivet nut mandrel is provided with an external thread of different sizes for allowing rivet nuts 90 of different thread sizes to be screwed thereon. With reference to FIGS. 5 to 7, in another preferred embodiment, the mandrel 40A is a rivet bolt mandrel and the threaded portion 412A of the rivet bolt mandrel is provided with an internal thread of different sizes for allowing rivet bolts 90A of different thread sizes to be screwed thereinto.

With reference to FIGS. 3 and 7, the head 42 is connected to the bottom end of the shaft 41 and has an outer diameter, an outer surface, a top surface and a non-circular annular flange 421. The outer diameter of the head 42 is larger than the outer diameter of the shaft 41. The top surface of the head 42 abuts the bottom surface of the driven member 14. The annular flange 421 extends from the outer surface of the head 42 and is adjacent the shaft 41 and may be polygonal, such as hexagonal.

The holding structure between the mandrel 40, 40A and sleeve 20 is a quick-change structure so that mandrels 40, 40A of different thread sizes can be quickly interchanged to conform to rivet nuts 90 and rivet bolts 90A of different thread sizes. The manufacturing process of such holding structure is simplified because it only comprises steps of forming the annular mounting groove 21 and then seating the positioning ring 30 in the annular mounting groove 21, which increases production efficiency and reduces manufacturing time and costs.

With reference to FIG. 2, when the hand-held rivet nut tool with the rivet nut mandrel 40 is in operation, the handles 12 are opened to drive the links 13 to move the driven member 14, sleeve 20 and rivet nut mandrel 40 in a direction toward the base 11 and to make the external threaded portion 412 of the rivet nut mandrel 40 extend from a top of the base 11. A rivet nut 90 is screwed onto the external threaded portion 412 of the rivet nut mandrel 40 and is then inserted into a predrilled hole in a work piece. Afterward the handles 12 are closed to drive the links 13 to move the driven member 14, sleeve 20 and rivet nut mandrel 40 in a direction away from the base 11. The moving rivet nut mandrel 40 pulls the rivet nut 90 so that the rivet nut 90 is deformed and is set to the work piece. After the rivet nut 90 is set, the rivet nut mandrel 40 is screwed out of the rivet nut 90.

With reference to FIG. 6, when the hand-held rivet bolt tool with the rivet bolt mandrel 40A is in operation, the handles 12 are opened to drive the links 13 to move the driven member 14, sleeve 20 and rivet bolt mandrel 40A in a direction toward the base 11 and to make the internal threaded portion 412A of the rivet bolt mandrel 40A move toward the top of the base 11. A rivet bolt 90A is screwed into the internal threaded portion 412A of the rivet bolt mandrel 40A and a head 91A of the rivet bolt 90A is then inserted into a predrilled hole in a work piece. Afterward the handles 12 are closed to drive the links 13 to move the driven member 14, sleeve 20 and rivet bolt mandrel 40A in a direction away from the base 11. The moving rivet bolt mandrel 40A pulls the rivet bolt 90A so that the head 91A of the rivet bolt 90A is deformed and is set to the work piece. After the rivet bolt 90A is set, the rivet bolt mandrel 40A is screwed out of the rivet bolt 90A.

Figure 4:
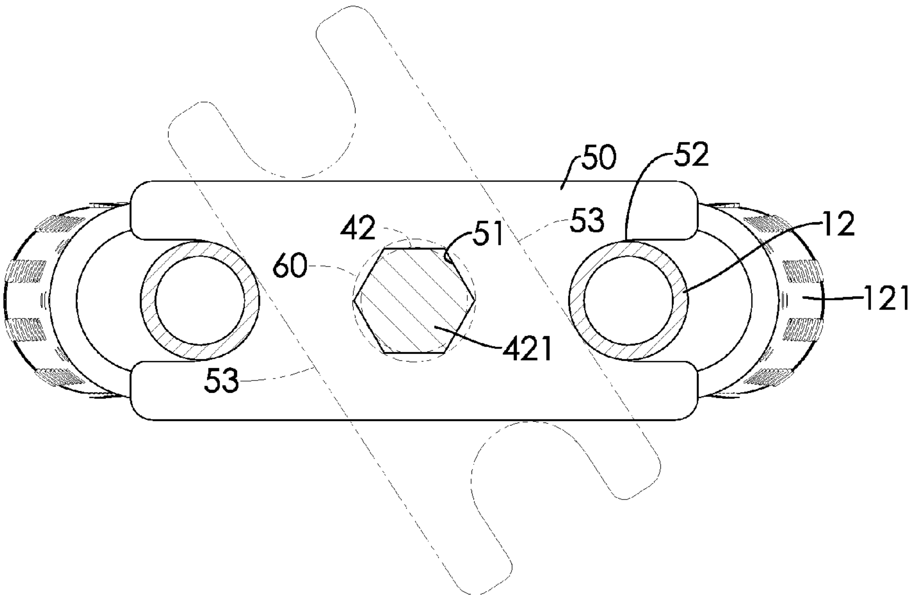
FIG. 4 is a top view in partial section of the hand-held rivet nut tool along line A-A in FIG. 1.

With reference to FIGS. 3, 7 and FIG. 4, the hand-held rivet nut (rivet bolt) tool in accordance with the present invention further comprises a limit piece 50 and a limit piece retainer 60. The limit piece 50 is rigid, is mounted around the annular flange 421 of the head 42 of the mandrel 40, 40A and has a center, two sides, two edges 53, a locking aperture 51 and two notches 52. The locking aperture 51 is formed through the center of the limit piece 50 for receiving the annular flange 421 of the head 42 of the mandrel 40, 40A. The shape of the locking aperture 51 corresponds to the non-circular shape of the annular flange 421 of the head 42 of the mandrel 40, 40A to prevent the mandrel 40, 40A from rotating relative to the limit piece 50. The locking aperture 51 may be polygonal, such as hexagonal. The two notches 52 are respectively formed in the two sides of the limit piece 50. The two handles 12 are received in the two notches 52 or abut the two edges 53 of the limit piece 50, thus preventing the mandrel 40, 40A from rotating relative to the sleeve 20. The limit piece retainer 60 is put onto the head 42 of the mandrel 40, 40A to avoid the limit piece 50 dropping from the annular flange 421 of the head 42 of the mandrel 40, 40A.

When a rivet nut 90 or rivet bolt 90A is jammed with the mandrel 40, 40A during the operation of screwing the rivet nut 90 or rivet bolt 90A to the mandrel 40, 40A, the limit piece 50 can be mounted around the annular flange 421 of the head 42 of the mandrel 40, 40A to fix the mandrel 40, 40A relative to the sleeve 20, and the limit piece retainer 60 can be put onto the head 42 of the mandrel 40, 40A to avoid the limit piece 50 dropping from the annular flange 421 of the head 42 of the mandrel 40, 40A during operation. Then an operator can use a pair of pliers to hold the jammed rivet nut 90 or the head 91A of the jammed rivet bolt 90A and easily rotate the entire rivet nut (rivet bolt) tool to disengage the mandrel 40, 40A from the jammed rivet nut 90 or rivet bolt 90A. When a rivet nut 90 or rivet bolt 90A fastened into a work piece is abnormally deformed and jammed with the mandrel 40, 40A during the operation of closing the handles 12, the limit piece 50 can also be mounted around the annular flange 421 of the head 42 of the mandrel 40, 40A to fix the mandrel 40, 40A relative to the sleeve 20, and the limit piece retainer 60 can be put onto the head 42 of the mandrel 40, 40A to avoid the limit piece 50 dropping from the annular flange 421 of the head 42 of the mandrel 40, 40A during operation. Then an operator can easily rotate the entire rivet nut (rivet bolt) tool to disengage the mandrel 40, 40A from the jammed rivet nut 90 or rivet bolt 90A. The rivet nut (rivet bolt) tool having the limit piece 50 enables the operator to easily disengage the mandrel 40, 40A from the jammed rivet nut 90 or rivet bolt 90A without destroying the work piece or rivet nut (rivet bolt) tool.

Even though numerous characteristics and advantages of the present invention have been set forth in the foregoing description, together with details of the structure and features of the invention, the disclosure is illustrative only. Changes may be made in the details, especially in matters of shape, size and arrangement of parts within the principles of the invention to the full extent indicated by the broad general meaning of the terms in which the appended claims are expressed.

What is claimed is:

1. A hand-held rivet nut tool comprising:

a body including:

a base having a bottom surface, two sides and a bore therethrough;

a pair of handles respectively pivotally connected to the sides of the base; and a driven member disposed between the handles and having two sides respectively pivotally connected to the handles by links;

a sleeve axially movably mounted through the bore of the base and including:

a bottom portion extending from the bottom surface of the base and connected to the driven member;

a central line;

a hole formed in the central line of the sleeve and having an inner surface; and an annular mounting groove formed in the inner surface of the hole of the sleeve;

a positioning ring seated in the annular mounting groove of the sleeve and including an inner portion extending from the inner surface of the hole of the sleeve;

a mandrel rotatably mounted through the hole of the sleeve and including a shaft having:

an outer surface;

a top portion;

an annular positioning groove foiined in the outer surface of the shaft and allowing the inner portion of the positioning ring to engage therewith; and a threaded portion formed on the top portion of the shaft; and a head connected to a bottom end of the shaft and having a non-circular annular flange extending from an outer surface thereof;

a limit piece mounted around the mandrel and having a non-circular locking aperture therethrough for receiving the annular flange of the head of the mandrel; and a limit piece retainer put onto the head of the mandrel for avoiding the limit piece dropping from the annular flange of the head of the mandrel.

2. The hand-held rivet nut tool as claimed in claim 1, wherein the mandrel is a rivet nut mandrel and the threaded portion of the rivet nut mandrel is provided with an external thread.

3. The hand-held rivet nut tool as claimed in claim 1, wherein the mandrel is a rivet bolt mandrel and the threaded portion of the rivet bolt mandrel is provided with an internal thread.

4. The hand-held rivet nut tool as claimed in claim 1, wherein the head of the mandrel further has a top surface abutting a bottom surface of the driven member.

5. The hand-held rivet nut tool as claimed in claim 2, wherein head of the mandrel further has a top surface abutting a bottom surface of the driven member.

6. The hand-held rivet nut tool as claimed in claim 3, wherein the head of the mandrel further has a top surface abutting a bottom surface of the driven member.

7. The hand-held rivet nut tool as claimed in claim 4, wherein the limit piece has two notches formed in two sides thereof; and the two handles are received in the two notches of the limit piece.

8. The hand-held rivet nut tool as claimed in claim 5, wherein the limit piece has two notches formed in two sides thereof; and the two handles are received in the two notches of the limit piece.

9. The hand-held rivet nut tool as claimed in claim 6, wherein the limit piece has two notches formed in two sides thereof; and the two handles are received in the two notches of the limit piece.

10. The hand-held rivet nut tool as claimed in claim 4, wherein the limit piece has two edges; and the two handles abut the two edges of the limit piece.

11. The hand-held rivet nut tool as claimed in claim 5, wherein the limit piece has two edges; and the two handles abut the two edges of the limit piece.

12. The hand-held rivet nut tool as claimed in claim 6, wherein the limit piece has two edges; and the two handles abut the two edges of the limit piece.

13. The hand-held rivet nut tool as claimed in claim 7, wherein the annular flange of the head of the mandrel is polygonal and the locking aperture of the limit piece is the corresponding polygonal.

14. The hand-held rivet nut tool as claimed in claim 8, wherein the annular flange of the head of the mandrel is polygonal and the locking aperture of the limit piece is the corresponding polygonal.

15. The hand-held rivet nut tool as claimed in claim 9, wherein the annular flange of the head of the mandrel is polygonal and the locking aperture of the limit piece is the corresponding polygonal.

16. The hand-held rivet nut tool as claimed in claim 10, wherein the annular flange of the head of the mandrel is polygonal and the locking aperture of the limit piece is the corresponding polygonal.

17. The hand-held rivet nut tool as claimed in claim 11, wherein the annular flange of the head of the mandrel is polygonal and the locking aperture of the limit piece is the corresponding polygonal.

18. The hand-held rivet nut tool as claimed in claim 12, wherein the annular flange of the head of the mandrel is polygonal and the locking aperture of the limit piece is the corresponding polygonal.

* * * * *